United States Patent [19]
Ruf

[11] 3,802,812
[45] Apr. 9, 1974

[54] INTERNAL SEAL FOR ROTARY PISTON COMBUSTION ENGINE

[75] Inventor: Max Ruf, Obereisesheim, Germany

[73] Assignee: Audi NSU Auto Union Aktiengesellschaft and Wankel GmbH, Lindau/Bondensee, Germany

[22] Filed: July 14, 1972

[21] Appl. No.: 271,766

[52] U.S. Cl. .................................. 418/142, 277/134
[51] Int. Cl. ............................................. F01c 19/00
[58] Field of Search...................... 418/142; 277/134

[56]  References Cited
UNITED STATES PATENTS

| | | | |
|---|---|---|---|
| 3,718,412 | 2/1973 | McCormick | 418/142 |
| 3,309,011 | 3/1967 | Osakada et al. | 418/142 |
| 3,323,712 | 6/1967 | Froede et al. | 418/142 |
| 3,400,939 | 9/1968 | Jones | 418/142 |
| 3,415,444 | 12/1968 | Frenzel | 418/142 |
| 3,506,275 | 4/1970 | Moriyama | 418/142 |
| 3,575,541 | 4/1971 | Hamada | 418/142 |
| 3,697,202 | 10/1972 | Reinhart | 418/142 |

FOREIGN PATENTS OR APPLICATIONS

| | | | |
|---|---|---|---|
| 1,016,540 | 1/1966 | Great Britain | 418/142 |

*Primary Examiner*—C. J. Husar
*Attorney, Agent, or Firm*—Kane, Dalsimer, Kane, Sullivan & Kurucz

[57] ABSTRACT

The invention relates to an internal seal for rotary piston combustion engines of the trochoid type in which a housing consisting of two end pieces and a multi-arcuate shell contains a polygonal piston rotatably mounted on an eccentric. At least one sealing ring conconcentric with the piston axis of rotation is disposed in a recess of the piston in each of its two end faces. The ring is pressed by spring means against the adjoining end piece and is sealingly and slidably engaged therewith to prevent passage of coolant or lubricant into the working chambers. The seal between the sealing ring and a wall of the recess in the end face of the piston is effected by an elastic ring.

6 Claims, 2 Drawing Figures

INTERNAL SEAL FOR ROTARY PISTON COMBUSTION ENGINE

BACKGROUND OF THE INVENTION

An internal seal has been proposed in which a ring of L-shaped cross section is sealed against the recess in the face of the piston by means of an O-ring of elastomer material, seated under prestressed condition between the axial leg of the ring entering into the recess in the face of the piston and the radial inner wall of the recess.

It has now been found that an O-ring of that type, owing to insufficient long-term heat resistance of the elastomeric material does not serve its purpose over long periods of time. The O-ring loses its elasticity and eventually fails to seal.

SUMMARY OF THE INVENTION

The foregoing disadvantage is avoided in accordance with the present invention, by replacing the O-ring with a ring of C-shaped cross section and of spring metal material. The ring is slit to provide a section open in a horizontal direction and thereby providing spring properties in a radial direction. This ring of C-shaped cross section retains its elasticity even at operating temperatures and provides a dependable seal between the L-shaped ring and the wall of the recess in the piston. In order to improve its slidability and compensate for minor tolerances and irregularities of the engaged surfaces, the ring of C-shaped cross section may be provided with a friction reducing coating as, for example, Teflon.

The entire seal assembly is brought into sealing contact axially against the inner face of the adjoining end piece by means of a corrugated spring ring lying on the bottom of the recess. The corrugated spring ring thus bears on the slit side of the ring of C-shaped cross section and holds it in contact with the radial flange of the L-shaped ring. In addition, it may bear on the end of the axial flange of the L-shaped ring.

Again, in another possible arrangement, the axial flange of the L-shaped ring is moved radially inward in mirror image arrangement, so that the C-shaped ring is moved out between said flange and the radially outer wall of the recess in the face of the piston. The recess in the face of the piston may in particular be an annular groove matching the cross section of the internal seal.

DETAILED DESCRIPTION

Figure 1:
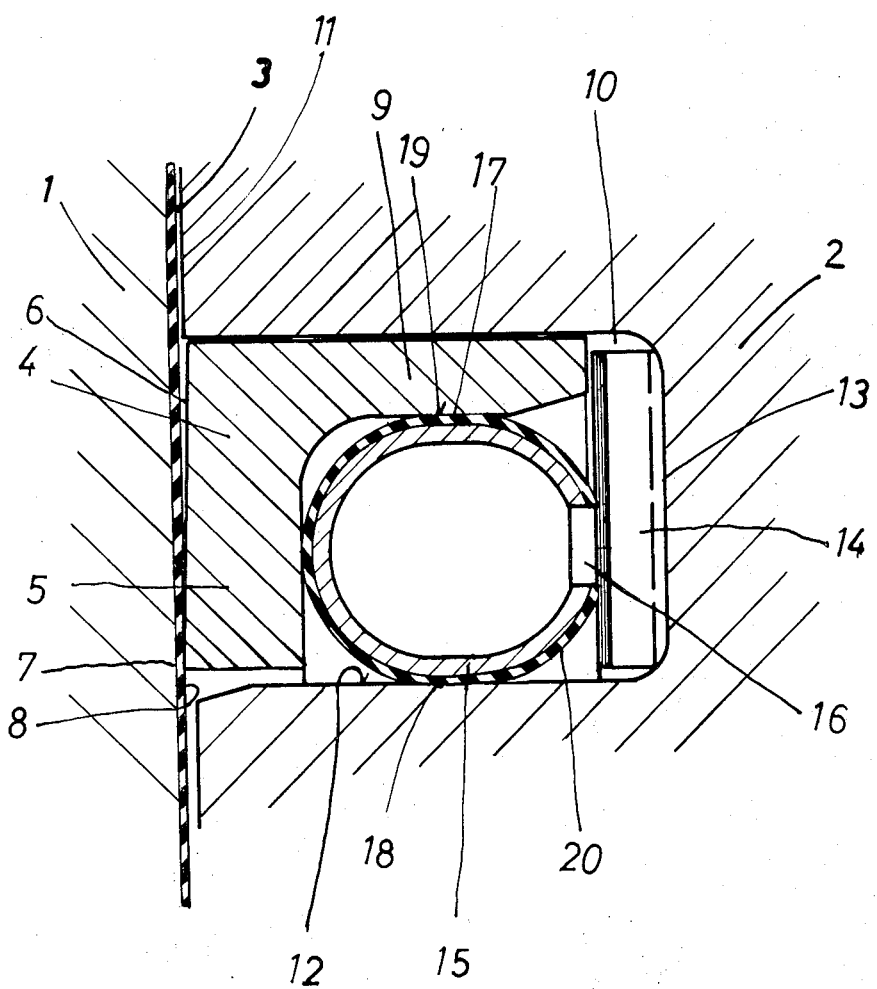
FIG. 1 shows a cross section of the internal seal as arranged in an annular groove in the face of the piston.

In FIG. 1, between the end piece 1 and piston 2 of a rotary piston combustion engine of the trochoid type, an internal seal is provided to seal off the gap 3 between the two parts. The seal consists essentially of an L-shaped ring 4 whose leg 5 extending radially inward is slightly beveled at 6 to form a sealing edge 7 which slidably seals with the inner face 8 of the end piece 1.

The axial leg 9 extends into an annular groove 10 in the face 11 of the piston 2. Disposed between the inner sides of the two flanges 5 and 9, the side wall 12 of the annular groove 10 and a corrugated spring ring 14 on the bottom 13 of the groove 10, is a ring 15. This ring is C-shaped in cross section and is fabricated of spring metal material. This ring 15 is provided with a slit 16 to impart to the ring spring properties in a radial direction. The ring 15 is prestressed to thereby make sealing contact on its axial surfaces 17 and 18 with the inner surface of flange 9 and with the radial inner wall 12 of the groove 10, respectively. In order to minimize friction at these points of contact and to compensate for minor tolerances and irregularities, the C-shaped ring is provided with a heat resistant, friction-reducing coating 20, which may be Teflon. The corrugated spring ring bearing on the bottom 13 of the groove 10 exerts its force on the opposed open side of the C-shaped ring 15. This force is transmitted to the radial flange 5 of the L-shaped ring 4 and thus brings the sealing edge 7 into contact with the inner face 8 of the end piece 1.

Figure 2:
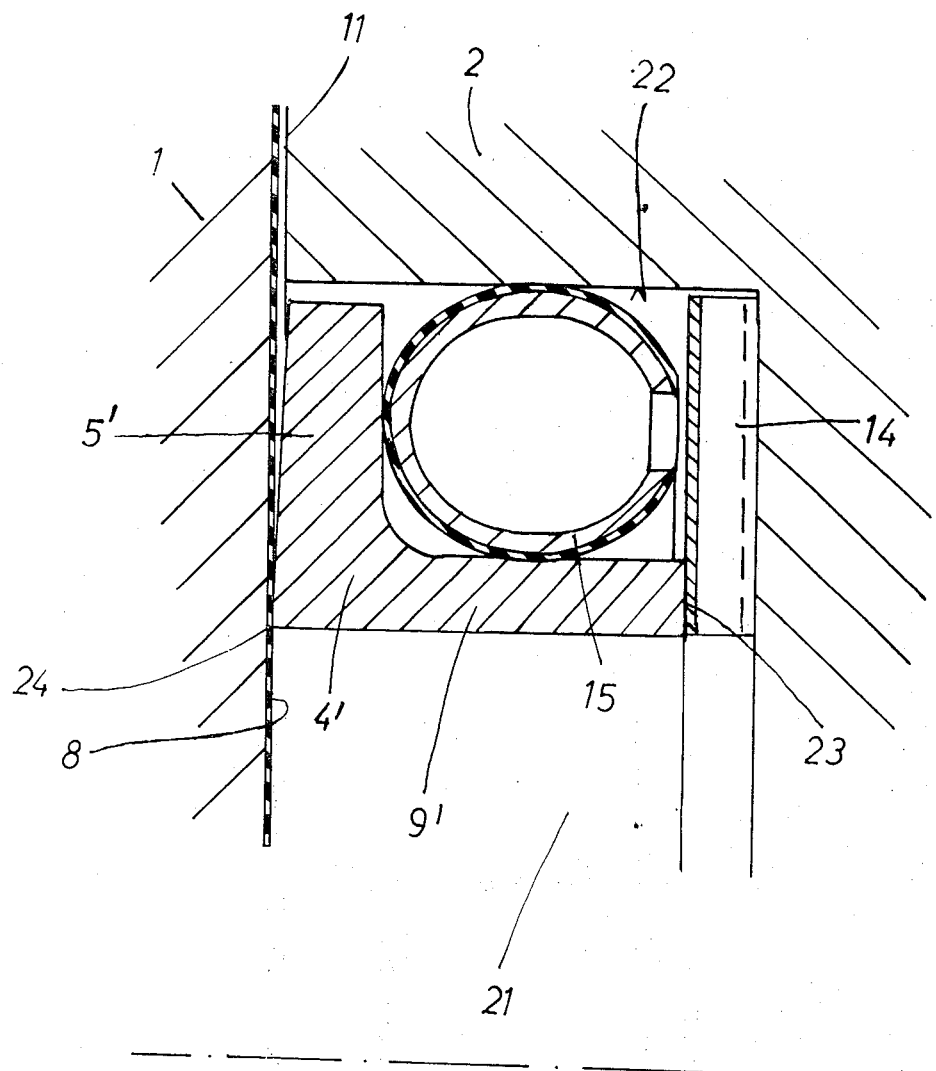
FIG. 2 shows a cross section of the internal seal as arranged mirror-imagewise in a recess in the face of the piston.

In FIG. 2, the L-shaped ring 4' is arranged in a recess 21 in the face 11 of piston 2. The axial flange 9' of this ring 4' is shifted radially inward so that the two flanges 5' and 9' form an open angle. The C-shaped ring 15 is arranged in this angle as a seal between the inner surface of flange 9' and the lateral surface 22 of the recess 21. The corrugated spring ring 14 acts on the end 23 of flange 9' and thus causes the sealing edge 24 to make tight contact with the inner face 8 of end piece 1.

In another possible arrangement, the ring 4 may be so designed that its conformation does not enable it to hold the C-shaped ring 15 in the recess 21 in the face 11 of piston 2. In that case, suitable retaining means, such as safety rings for example, may be provided either on the side wall of recess 21 touched by ring 15 or on ring 4.

I claim:

1. In an internal seal for rotary piston combustion engines of the trochoid type having a housing of two end pieces and a multi-arcuate shell in which a polygonal piston is rotatably mounted on an eccentric, the piston having at least one sealing ring concentric with its axis of rotation in a recess on each of its two end faces the sealing ring being pressed by spring means against the adjoining end piece and sealingly slidable thereon, said sealing ring having a surface parallel to a wall of said recess and means for establishing a seal between said sealing ring and said wall the improvement which comprises as the means for establishing said seal; a spring metal ring, C-shaped in cross-section, interposed between said surface and said wall and abutting each of said surface and said wall along continuous lines of contact, said C-shaped ring forcing said sealing ring surface against said recess wall.

2. An internal seal according to claim 1, wherein the C-shaped ring 15 is provided on its outer surface with a friction reducing, heat resistant coating compensating for equalizing minor tolerances and irregularities.

3. An internal seal according to claim 1 wherein the C-shaped ring is arranged between the outer surface of the sealing ring and the adjacent wall of the recess with means being provided for holding the C-shaped ring in position.

4. An internal seal according to claim 1, wherein the sealing ring has an L-shaped cross section defined by the axial flange and the radial flange forming an angle open radially inward by the C-shaped ring being arranged with the angle.

5. An internal seal according to claim 1 wherein the sealing ring has flanges forming an angle open radially outwardly in which the C-shaped ring is arranged.

6. An internal seal according to claim 1 wherein the spring means is a corrugated spring ring, bearing on one side against the bottom of the recess and on the other side by way of the C-shaped ring against the sealing ring to press the sealing ring against the associated end piece.

* * * * *